Nov. 9, 1965  J. P. GAFFARD  3,216,318
OPTICAL APPARATUS WITH SINUSOIDAL MASK FOR THE
OBSERVATION OF PHASE OBJECTS
Filed Sept. 7, 1960  3 Sheets-Sheet 1

INVENTOR.
JEAN PAUL GAFFARD
BY Bauer and Seymour
ATTORNEYS

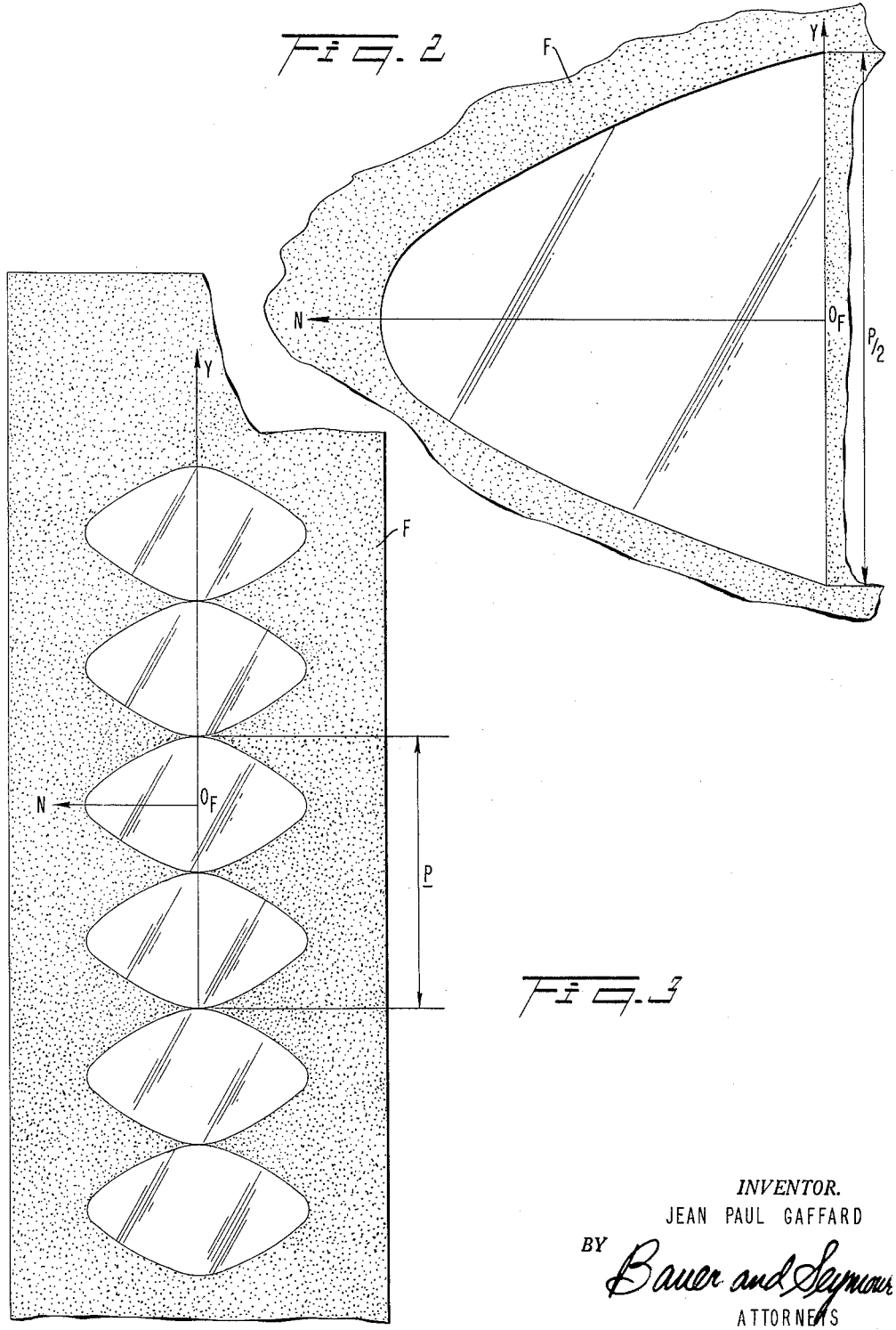

INVENTOR.
JEAN PAUL GAFFARD

United States Patent Office 3,216,318
Patented Nov. 9, 1965

3,216,318
OPTICAL APPARATUS WITH SINUSOIDAL MASK FOR THE OBSERVATION OF PHASE OBJECTS
Jean Paul Gaffard, Paris, France, assignor to Compagnie de Saint-Gobain, Neuilly-sur-Seine, France
Filed Sept. 7, 1960, Ser. No. 54,450
Claims priority, application France, Sept. 9, 1959, 804,695, Patent 1,243,903
9 Claims. (Cl. 88—39)

In optics "phase objects" are bodies which differ from one point to another only by variations in thickness or by variations of the index of refraction, so that light transmitted or reflected from a phase object does not undergo modifications of intensity or color but only local variations of phase, to which the eye is insensible. This is the case, for example, of thin transparent plates or mirrors presenting defects of cut or structure. Different procedures are known for rendering such local variations of phase observable. Among such procedures are those of contrast of phase, interference, and interferential contrast.

This invention relates to a process and to an apparatus for the observation of phase objects, the invention employing the method known as interferential contrast in which one wave is divided in two, as for example by its travel through birefringent prisms. The presence of a phase object disturbs the interference phenomena, and thus permits the defects in the specimen to be observed. The process and apparatus of the present invention are characterized by the use of a novel mask for dividing a wave of light into two waves.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a schematic view in perspective of an optical system in accordance with the invention;

FIG. 2 is an enlarged fragmentary view of a portion of the dividing filter employed in the apparatus of FIG. 1;

FIG. 3 is a view in end elevation of such filter; and

Figure 1:
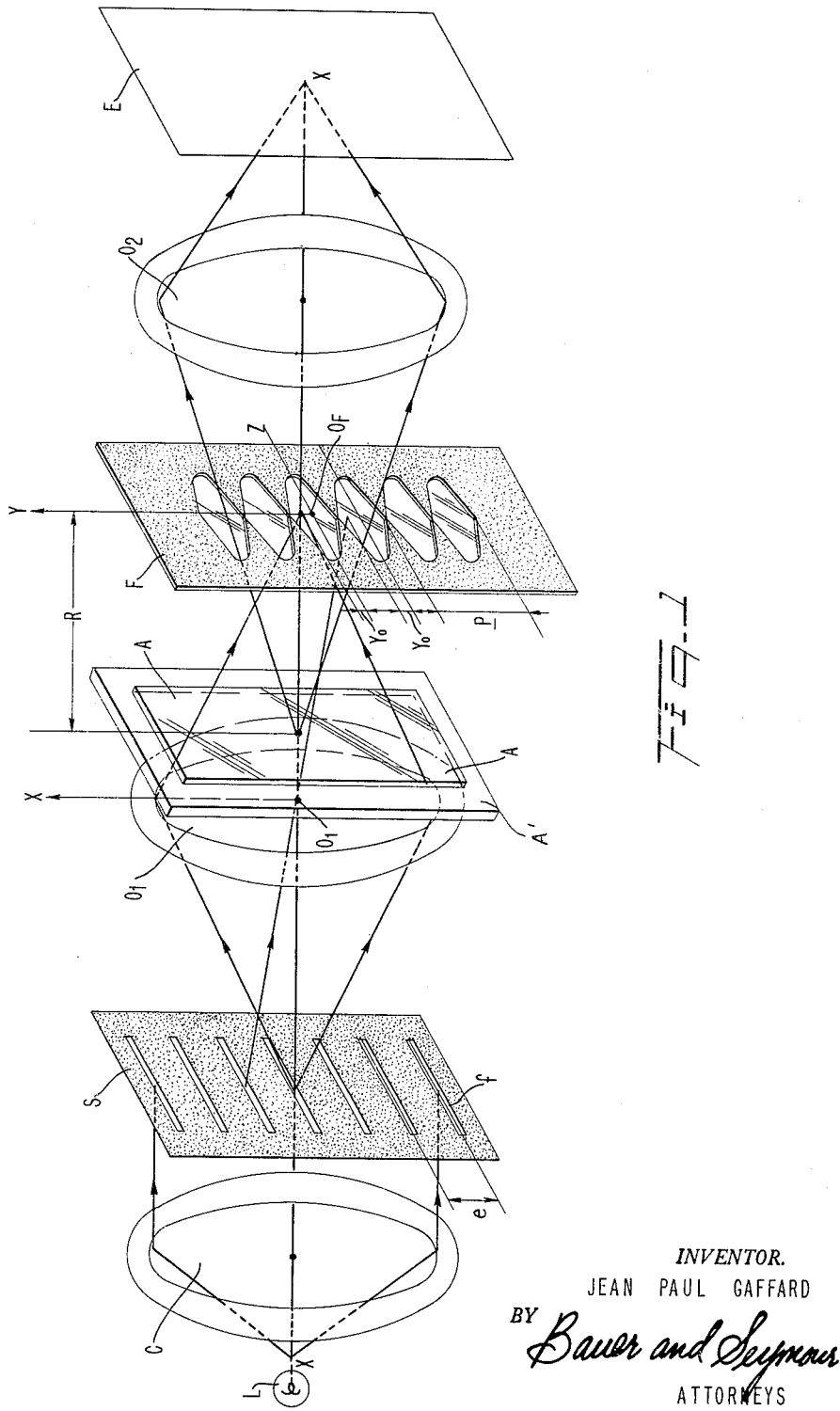

The invention will be described with reference to FIG. 1, showing a non-limiting example of the invention. In FIG. 3, in order to render the apparatus shown more readily comprehensible, the dimensions of the parts perpendicular to the optical axis X—X are considerably exaggerated in size. In reality the apparatus employs angular fields sufficiently small for secondary phenomena or aberrants not to be manifested.

In FIG. 1 a source of light S is composed of an opaque plate haivng a plurality of slits $f$ therein. Slits $f$ have a breadth which is small with respect to the spacing between successive slits. The slits $f$ are straight, parallel to each other, and lie spaced apart by a constant distance $e$ or a multiple $qe$ of such distance. The distance $e$ may vary widely, but generally it may be on the order of from a fraction of one mm. to 1 mm. The number of slits $f$ employed may vary from one to any practical number provided that, when a plurality of slits are used, they are separated by the distance $e$ or $qe$, as shown. The greater the number of slits, the greater is the luminosity of the image. Slits $f$ may be illuminated by any suitable known method, for example, as schematically shown in FIG. 1, by means of a lamp L, such illuminating means also preferably including a condenser C. An objective lens $O_1$, disposed in a transverse plane containing the vertical line $x$, forms the image of the source S in the vicinity of the plane of the mask F. A phase object shown as a transparent flat plate A, is placed between the objective $O_1$ and the mask F, preferably, as shown, close to the objective lens $O_1$. A means A' is provided for holding the phase object A, holder A' being adjustable as required along the optical axis by means not shown. A second objective lens $O_2$ forms the image of the phase object A on a screen E. Mask F is placed between the phase object A and the objective $O_2$, the latter being by preference placed near mask F. It is clear that the screen E and the objective $O_2$ may be replaced by other suitable observation means which give either a visual signal response or which allow the signal to be recorded. The apparatus thus far described is known in the interferometer art with the exception of the filter F, which is of novel construction.

The essential element of device F is an opaque mask having transparent zones therein, such transparent zones including at least a half-period of a sinusoid disposed on its periodic axis, as shown in FIG. 2. It can be demonstrated that when a coherent incident wave passes through such mask the wave is decomposed into two emergent secondary waves disposed at an angle $a$ to each other such that:

$$a = \frac{2\lambda}{np}$$

$\lambda$ being the wave length of the incident light, $n$ being the index of refraction of the transparent zones of the mask, and $p$ being the period of the sinusoid.

In FIG. 2 one half-period of a sinusoid suitable for such transparent zones is shown. Such transparent zone of the masking element may be completed by an oppositely disposed zone symmetrical thereto and with respect to the axis $y$ of the sinusoid; it is possible to associate a certain number of such elements provided they have all the same periodicity and axes of the sinusoids parallel and provided they remain distinct one from the other.

Figure 4:
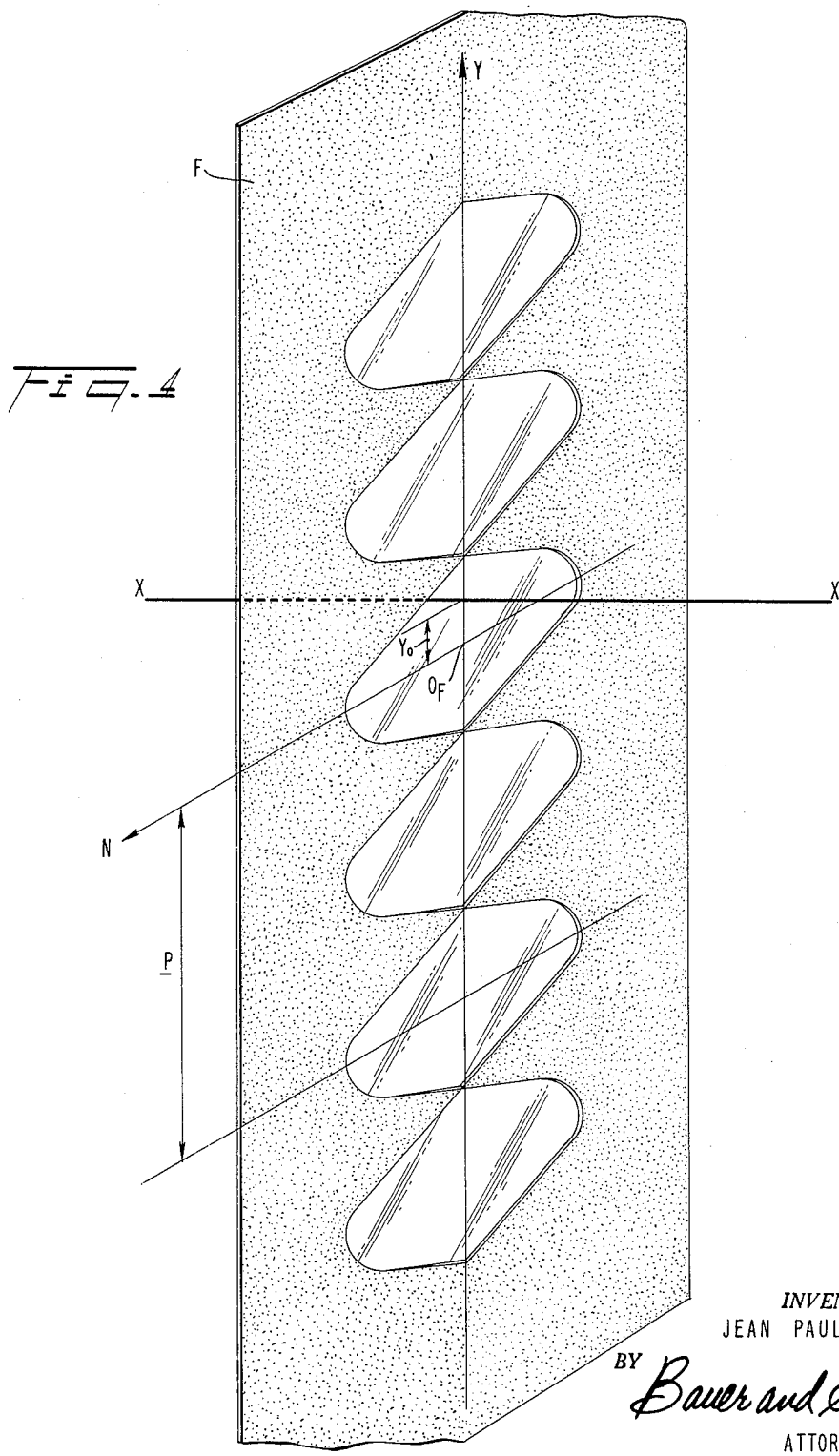
FIG 4 is an enlarged view in perspective of the filter of FIG. 1, FIG. 4 being taken along the same line of view as FIG. 1.

For example, the mask F shown in FIGS. 3 and 4 is perforated to have two complete sinusoids of opposite phase and having the same axis $O_FY$ and the same period $p$, the axis $O_FZ$ passing through the maximum amplitude. The mask shown includes three complete periods $p$ but it is clear that the number of such periods may be varied widely if desired.

The mask may be simply made as, for example, by forming opaque areas on glass by gravure, by photography, by the deposition of an opaque coating on a glass plate, or by a system employing a perforated opaque mask.

The mask F is not centered upon the optical axis X—X. To the contrary, such axis X—X intersects the axis $O_FY$ of the mask at a point located at a distance $y_0$ from point $O_F$. Under such conditions the two emergent waves are out of phase by the phase difference $D_0$ such that:

$$D_0 = \frac{2\lambda}{n} \frac{y_0}{p}$$

wherein $\lambda$ is the wave length of the incident light, $n$ is the index of refraction of the transparent zones of the mask, $p$ is the period of the sinusoid, and $y_0$ is the distance between the axis X—X of the mask F from the point $O_F$.

It is clear that one may employ, instead of a single incident wave, a family of waves of which the focus responds to the condition $y=y_0$. Instead of such family of waves, there may be employed a congruence of waves which obey the equation $$y = y_o + K\frac{p}{2}$$

(K being an integral number, either positive or negative). Thus there can be employed a light source S composed of a plurality of slits $f$ spaced a distance $e$ or $qe$ such that the images of such slits produced by the objective $O_1$ on the mask F will be spaced a distance $$\frac{p}{2}$$

or a distance $$q\frac{p}{2}$$

($p$ being the period of the sinusoid).

The luminous waves having passed through the slits $f$, then pass through the lens $O_1$. After leaving such lens they pass through the phase object A where they are deformed; the deformed waves are divided by the mask F. The objective $O_2$ forms upon the screen E the image of the object A.

The presence of the phase object A in the path of the primary or incident wave traveling from the source S to the mask F produces the out of phase condition of such primary wave and modifies the interferences produced by the two secondary divided waves leaving the mask F. The phase object A produces a localized out of phase condition in the surfaces of the light waves passing through such object. For example, a spherical wave will be deformed and will present local advances or retardations of phase with respect to the undeformed wave.

Designating the degree of the out of phase condition of the primary wave by D and designating the distance between the phase object A and the mask F by R, the degree of illumination of the image E will be proportional to $$1 + \cos\frac{2\pi n}{\lambda}\left(D_o - aR\frac{dD}{dx}\right)$$

wherein $a$ is the angle at which the two emergent secondary waves are disposed with respect to each other, $$\frac{dD}{dx}$$

is a derivative, and the other terms have the same meaning as given above, which defines the said state of interferences.

When no phase object is present in the system, or when an object without local variations therein is placed in the system at A, the field on screen E is uniformly illuminated or covered with straight black and white fringes, depending upon the manner of adjustment of the apparatus. When a phase object A is placed in the system as shown, there may be observed the slope of change of local phase produced by said phase object.

In a first manner of utilizing the apparatus of the invention (wherein there is a division of the wave less than the power of resolution of the eye of the observer using the apparatus) in accordance with the invention the mask F will preferably be placed in such manner that $$y_o = \frac{p}{8}$$

from which $$D_o = \frac{\lambda}{4n}$$

and also in such manner as to give the image a shaded effect, which permits its interpretation.

To increase the sensitivity of the apparatus, the value $a$ may be made as large as possible (for example, by decreasing $p$, the period of the sinusoid). The value of $a$ should not be increased, however, to such point that the observer using the apparatus sees the dividing or doubling of the image. In other words, the value of $a$ should be at most equal to the power of separation of the eye of the operator using the apparatus. The power of separation of the eye associated with the apparatus gives the limits of the sensitivity of the apparatus according to the invention.

In another use of the apparatus (wherein there occurs doubling or dividing substantially above the power of resolution) the apparatus allows, for example, the measurement of the degree to which the secondary waves are out of phase and the statistical control of the maximum variation of the optical properties of a product.

The breadth of the slits $f$ of the light source S is calculated as a function of the quality of light required for the image. Such breadth is, in general, equal to between $\frac{1}{20}$ and $\frac{1}{4}$ of the period $p$ of the sinusoid. It is clear that the sinusoid of the mask in accordance with the invention may be replaced by any curve substantially approaching it in shape, but the divergence between such curve and a sinusoid decreases the effectiveness and accuracy of the system.

With respect to known procedures, the process of the present invention employing the described mask presents important advantages; the manufacture of the apparatus is more simple, as well as less onerous; the control of the apparatus is simpler; and since the image is particularly luminous and without a parasite halo, interpretation of the image is easy.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. In apparatus for the observation of phase objects by interferential contrast, the apparatus having a light source comprising at least one optical slit, a first objective yielding an image of the source, means for holding a phase object beyond the first objective, and a mask, the first objective yielding an image of the light source located in the vicinity of the mask in alignment with a phase object mounted on the holder, and a second objective producing an observable and examinable image of the phase object, the light source, the first and second objectives, and the phase object holding means, lying generally along the optical axis of the apparatus, the improved mask which comprises a body having a transparent zone therethrough in the shape of one-half a sinusoid, the mask being placed so that the optical axis of the apparatus intersects the periodic axis of the mask at a predetermined location out of phase from the zone of maximum amplitude of the sinusoid, the axis of said slit being symmetrical with, and at right angles to the axis of the sinusoid.

2. Apparatus as claimed in claim 1, wherein the light source includes a plurality of similar parallel rectilinear slits positioned in a plane normal to the optical axis of the apparatus, the slits are spaced at equal distances from each other, the mask has transparent zones therethrough in the shape of a plurality of aligned similar contiguous half-sinusoids, and the image of the slits produced by the first objective has for its period the half-period of the sinusoids.

3. Apparatus as claimed in claim 2, wherein the half-sinusoids of the mask are aligned in a direction normal to the optical axis of the apparatus.

4. Apparatus as claimed in claim 1, wherein the light source includes a plurality of similar parallel rectilinear slits positioned in a plane normal to the optical axis of the apparatus, the slits are spaced at equal distances from each other, the mask has transparent zones therethrough in the shape of a plurality of aligned similar contiguous half-sinusoids, and the image of the slits produced by the first objective has for its period an integral number of the half-period of the sinusoids.

5. Apparatus as claimed in claim 1, wherein the light source includes a plurality of similar parallel rectilinear slits positioned in a plane normal to the optical axis of the apparatus, the slits are spaced at equal distances from each other, the filter has transparent zones therethrough of the shape of two sinusoids of opposite phase but similar shape having the same periodic axis, and the image of the slits produced by the first objective has for its period the half-period of the sinusoids.

6. Apparatus as claimed in claim 5, wherein the sinusoids of the mask are aligned in a direction normal to the optical axis of the apparatus.

7. Apparatus as claimed in claim 1, wherein the mask is placed so that the optical axis of the apparatus meets the periodic axis of the filter with a determined difference of phase between such two axes.

8. In apparatus for the observation of phase objects by interferential contrast, said apparatus having a light source comprising at least one optical slit, a first objective yielding an image of said source, means for holding a phase object beyond said first objective, and a mask, said first objective yielding an image of said light source located in the vicinity of said mask in alignment with a phase object mounted on said holding means, and a second objective producing an observable and examinable image of the phase object, said light source, first and second objectives, and holding means, lying generally along the optical axis of the apparatus, said mask comprising an opaque surface normal to said axis and having formed therein transparent openings defined by edges formed as two coextensive sine curves to the same scale and having a common axis and a period difference of $\pi$, the axis of said slit being symmetrical with and at right angles to the common axis of said sinusoidal edges.

9. The apparatus of claim 8, said edges extending continuously through a range of at least $2\pi$ radians.

References Cited by the Examiner
UNITED STATES PATENTS

| | | | |
|---|---|---|---|
| 2,589,421 | 3/52 | Morrison | 88—61 |
| 2,805,599 | 9/57 | Pajes | 88—14 X |
| 2,867,148 | 1/59 | Svensson | 88—14 |
| 2,883,900 | 4/59 | Svensson | 88—14 |
| 2,950,648 | 8/60 | Rhodes | 88—39 |
| 2,977,847 | 4/61 | Arendt | 88—39 |
| 3,008,577 | 11/61 | Miles | 88—56 X |
| 3,045,531 | 7/62 | Prescott | 88—14 |

DAVID H. RUBIN, *Primary Examiner.*

EMIL G. ANDERSON, *Examiner.*